United States Patent [19]
Kumar

[11] Patent Number: 5,441,413
[45] Date of Patent: Aug. 15, 1995

[54] TEACHING AID FOR SPINAL MOBILIZATION AND MANIPULATION THERAPY

[75] Inventor: Shrawan Kumar, Edmonton, Canada

[73] Assignee: The Governors of the University of Alberta, Edmonton, Canada

[21] Appl. No.: 238,054

[22] Filed: May 4, 1994

[51] Int. Cl.⁶ .............................................. G09B 23/28
[52] U.S. Cl. .................................. 434/275; 434/274; 434/262
[58] Field of Search ............... 434/275, 274, 270, 265, 434/262; 606/237, 264

[56] References Cited

U.S. PATENT DOCUMENTS

| | | | |
|---|---|---|---|
| 1,581,736 | 4/1926 | Hassler . | |
| 1,829,968 | 11/1931 | Smith . | |
| 2,045,812 | 6/1936 | Upson | 434/275 |
| 2,103,021 | 12/1937 | Salsman | 35/17 |
| 2,537,573 | 1/1951 | Conschafter | 35/17 |
| 4,095,352 | 6/1978 | Kale | 35/17 |
| 4,278,095 | 7/1981 | Lapeyre | 128/689 |
| 4,360,345 | 11/1982 | Hon | 434/262 |
| 4,605,373 | 8/1986 | Rosen | 434/274 |
| 4,711,230 | 12/1987 | Berke et al. | 606/237 |
| 4,797,104 | 1/1989 | Laerdal et al. | 434/265 |

OTHER PUBLICATIONS

Chiropractic Equipment & Supplies 1991 Catalog Professional Chiropractic System, Inc.
Parker Chiropractic Success Catalog, distributed by Share International.
Meyer Distributing Co. 1994 Speciality Catalog.
Continental S.E.h. Product Catalog 1994.
Chiropractic Products, Feb. 1994.

Primary Examiner—Robert A. Hafer
Assistant Examiner—Michael O'Neill
Attorney, Agent, or Firm—Anthony R. Lambert

[57] ABSTRACT

A teaching aid for spinal mobilization and manipulation therapy is described which includes a first support on which is mounted a spinal model. A second support underlies the first support. A third support underlies the second support. The third support has a cavity into which the second support is telescopically received. Telescopic movement of the second support relative to the third support occurs when a force is applied to the first support. A load sensor is disposed between the first support and the second support whereby a force with which the first support is pressed toward the second support is measured. A plurality of springs are disposed between the second support and the third support to provide resistance to telescopic movement of the second support relative to the third support. A displacement sensor is secured between the second support and the third support whereby the displacement of the second support relative to the third support is measured. A microprocessor is linked to the load sensor and the displacement sensor. The microprocessor is programmed to receive signals from the load sensor and the displacement sensor, convert the signals into values, and compare the values as to the amount of displacement occurring and the amount of force being applied to a therapeutic range of values. Human readable feedback is provided as to whether the measured values for force and displacement are within the therapeutic range.

2 Claims, 3 Drawing Sheets

TEACHING AID FOR SPINAL MOBILIZATION AND MANIPULATION THERAPY

The present invention relates to a teaching aid for spinal mobilization and manipulation therapy.

BACKGROUND OF THE INVENTION

Spinal mobilization and manipulation therapy, involving a manual adjustment of the spine, is recognized as having beneficial effects. It is the foundation of the chiropractic field of medicine.

With spinal mobilization and manipulation therapy the amount of pressure applied is critical. When the pressure applied is insufficient, the treatment lacks utility. When the pressure applied is excessive, the patient may suffer physical harm.

Text book descriptions of assessment and treatment techniques use terms such as "firm" or "steady" to describe the forces required. These terms are subject to individual interpretation.

The pressure applied must be related to the amount of spinal displacement that is occurring. The amount of pressure required to achieve a therapeutic displacement of the spine varies between patients.

SUMMARY OF THE INVENTION

What is required is a teaching aid for spinal mobilization and manipulation therapy which provides feedback to a therapist regarding the amount of pressure to be applied achieve a therapeutic displacement of the spine.

According to the present invention there is provided a teaching aid for spinal mobilization and manipulation therapy which includes a first support on which is mounted a spinal model. A second support underlies the first support. A third support underlies the second support. The third support has a cavity into which the second support is telescopically received. Telescopic movement of the second support relative to the third support occurs when a force is applied to the first support. A load sensor is disposed between the first support and the second support whereby a force with which the first support is pressed toward the second support is measured. A plurality of springs are disposed between the second support and the third support to provide resistance to telescopic movement of the second support relative to the third support. A displacement sensor is secured between the second support and the third support whereby the displacement of the second support relative to the third support is measured. A microprocessor is linked to the load sensor and the displacement sensor. The microprocessor is programmed to receive signals from the load sensor and the displacement sensor, convert the signals into values, and compare the values as to the amount of displacement occurring and the amount of force being applied to a therapeutic range of values. Human readable feedback is provided as to whether the measured values for force and displacement are within the therapeutic range.

The teaching aid, as described above, enables a mobilization and manipulation therapist to determine the amount of force required to provide displacement of the spine within the therapeutic range.

Although beneficial results may be obtained through the use of the teaching aid, as described above, the relative stiffness of adjacent articular segments is a function of the change in applied force to a change in displacement. It is the applied force in combination with the resultant motion that occurs under specific conditions of stiffness that determines the consequences of the therapist's action during mobilizations. Even more beneficial results may, therefore, be obtained when the spring resistance is variable thereby simulating patients with varying spinal stiffness.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
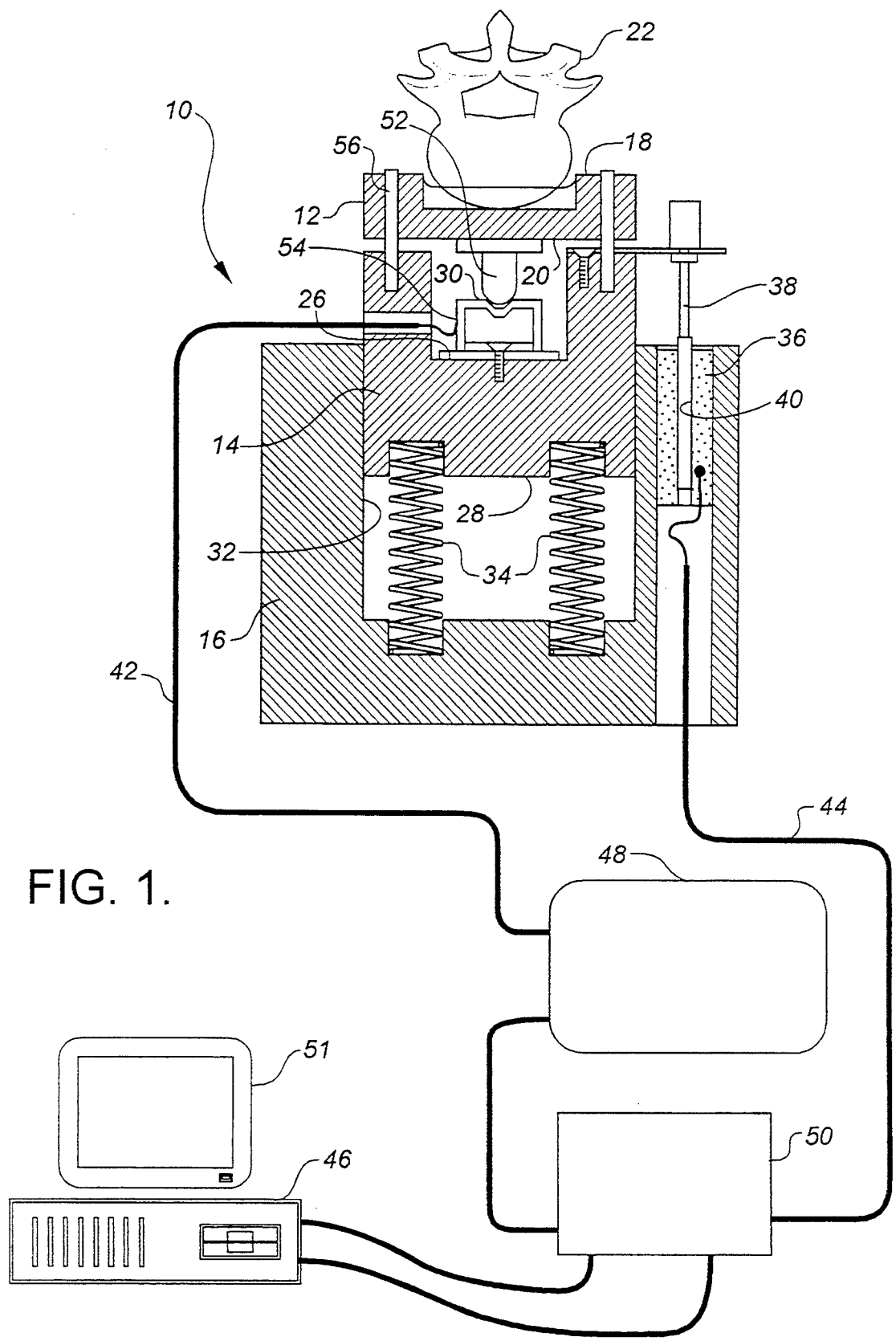
FIG. 1 is a schematic view of an end elevation view in section of a teaching aid for spinal mobilization and manipulation therapy constructed in accordance with the present invention.
Figure 2:
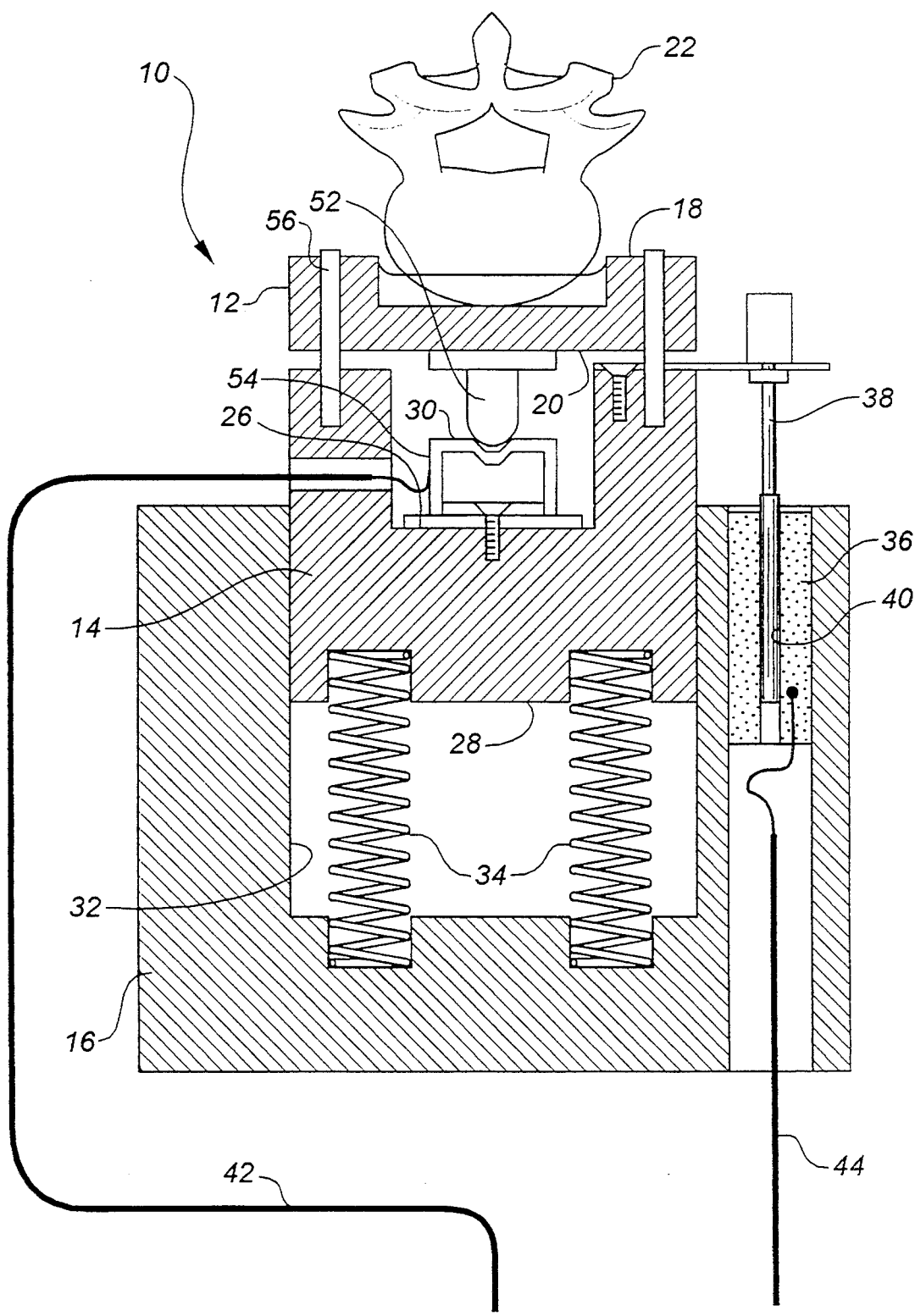
FIG. 2 is an end elevation view in section of the teaching aid for spinal mobilization and manipulation illustrated in FIG. 1, in a first position.
Figure 3:
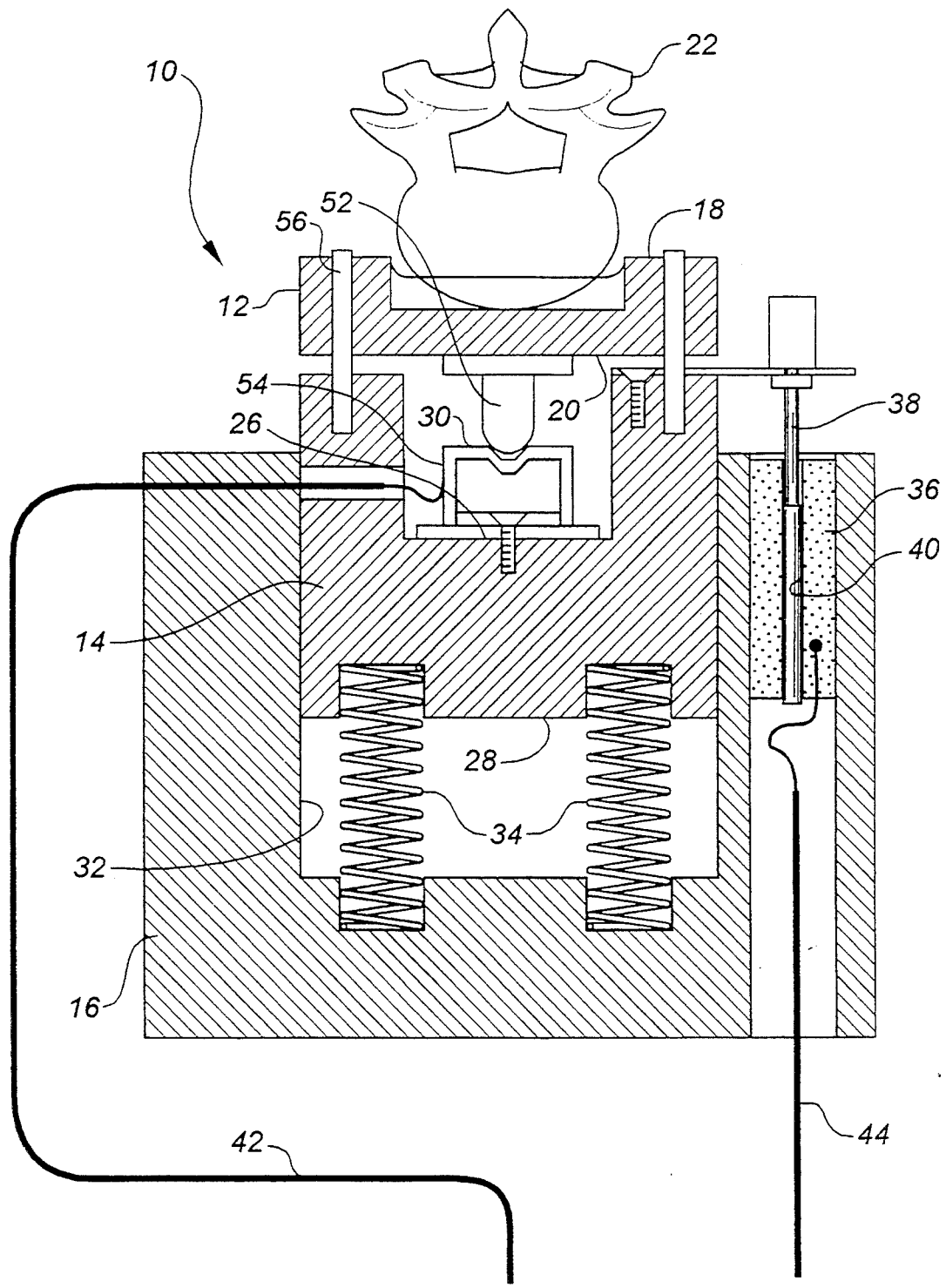
FIG. 3 is an end elevation view in section of the teaching aid for spinal mobilization and manipulation illustrated in FIG. 1, in a second position.

The preferred embodiment, a teaching aid for spinal mobilization and manipulation therapy generally identified by reference numeral 10, will now be described with reference to FIGS. 1 through 3.

Teaching aid 10 includes a first support 12, a second support 14, and a third support 16. First support 12 has a top surface 18 and a bottom surface 20. A spinal model 22 is mounted on top surface 18 of first support 12. Second support 14 underlies first support 12. Second support 14 has a top surface 26 and a bottom surface 28. A load sensor 30 disposed between bottom surface 20 of first support 12 and top surface 26 of second support 12. A force exerted upon spinal model 22 to press first support 12 toward second support 14 is measured by load sensor 30. Third support 16 underlies second support 14. Third support 16 has a cavity 32 into which second support 14 is telescopically received. Telescopic movement of second support 14 relative to third support 16 occurs when a force is applied to spinal model 22 of first support 12. A plurality of springs 34 are disposed between bottom surface 28 of second support 14 and cavity 32 of third support 16 to provide resistance to telescopic movement of second support 14 relative to third support 16. A displacement sensor 36 is secured to second support 14 and third support 16. The displacement of second support 14 relative to third support 16 is recorded by displacement sensor 36. Displacement sensor 36 has a male member 38 which moves further into a female housing 40 as second support 14 is displaced further into cavity 32 of third support 16. Load sensor 30 and displacement sensor 36 are linked by means of cables 42 and 44, respectively, to a microprocessor 46. Other optional equipment illustrated in FIG. 1, include a signal conditioning unit 48, a power supply and amplifying unit 50, and a display monitor 51. Signal conditioning unit 48 places the signals received from load sensor 30 into a form acceptable for microprocessor 46. Power supply and amplifying unit 50 ensures that all the described components receive the necessary power requirements. The form of load sensor 30 which is used has two components 52 and 54 and measures the force exerted by component 52 upon component 54. For orienting the forces vertically, guides 56 are provided which extend between first support 12 and second support 14.

The use and operation of teaching aid 10 will now be described with respect to FIGS. 1 through 3. Referring to FIG. 2, teaching aid is illustrated in a first or initial resting position prior to the application of force by a therapist. A therapist exerts a force upon spinal model 22. This force is sensed by load sensor 30 and the data is transmitted via cable 42 to microprocessor 46. Referring to FIG. 3, the force applied serves to compress springs 34 resulting in a displacement of second support 14 relative to cavity 32 of third support 16. Upon displacement occurring male member 38 of displacement sensor 36 extends into female housing 40. Referring to FIG. 1, the magnitude of the displacement is sensed by displacement sensor 36 and the data is transmitted via cable 44 to microprocessor 46. Microprocessor 46 is programmed to receive signals from load sensor 30 and displacement sensor 36. The signal from load sensor 30 is converted into values of displacement and force. Microprocessor 46 then compares the values as to the amount of displacement occurring and the amount of force being applied to a therapeutics range of values. The results of the analysis are then provided in human readable form. In this case, display monitor 51 provides a graphic image that demonstrates whether the measured values for force and displacement are within the therapeutic range. It is preferred that the resistance provided by springs 34 be variable so as to duplicate varying conditions of spinal stiffness. In teaching aid 10, variable resistance is provided by manually adding or removing springs from cavity 32 of third support 16. The resistance is in direct proportion to the number of springs 34 that are provided. It will be apparent that as the system is refined a more sophisticated manner of varying resistance can be substituted.

It will be apparent to one skilled in the art that modifications may be made to the illustrated embodiment without departing from the spirit and scope of the invention as defined by the claims.

I claim:

1. A teaching aid for spinal mobilization and manipulation therapy, comprising:
   a. a first support on which is mounted a spinal model;
   b. a second support underlying the first support;
   c. a third support underlying the second support, the third support having a cavity into which the second support is telescopically received such that telescopic movement of the second support relative to the third support occurs when a force is applied to the first support;
   d. a load sensor disposed between the first support and the second support whereby a force with which the first support is pressed toward the second support is measured;
   e. a plurality of springs disposed between the second support and the third support to provide resistance to telescopic movement of the second support relative to the third support;
   f. a displacement sensor secured between the second support and the third support whereby the displacement of the second support relative to the third support is measured; and
   g. a microprocessor linked to the load sensor and the displacement sensor, the microprocessor being programmed to receive signals from the load sensor and the displacement sensor, convert the signals into values, and compare the values as to the amount of displacement occurring and the amount of force being applied to a therapeutic range of values and provide human readable feedback as to whether the measured values for force and displacement are within the therapeutic range.

2. The teaching aid for spinal mobilization and manipulation therapy as defined in claim 1, wherein the spring resistance is variable thereby simulating patients with varying spinal stiffness.

* * * * *